United States Patent [19]
Violett et al.

[11] Patent Number: 4,685,289
[45] Date of Patent: * Aug. 11, 1987

[54] POWER PLANT FOR MODEL JET AIRCRAFT

[76] Inventors: Robert S. Violett, 1373 Citrus Rd., Winter Springs, Fla. 32708; W. Lee Anderson, 1233 South Ross, Santa Ana, Calif. 92707

[*] Notice: The portion of the term of this patent subsequent to Dec. 10, 2002 has been disclaimed.

[21] Appl. No.: 797,922

[22] Filed: Nov. 14, 1985

Related U.S. Application Data

[63] Continuation-in-part of Ser. No. 272,914, Jun. 12, 1981, Pat. No. 4,557,107.

[51] Int. Cl.⁴ ............................................. A63H 27/06
[52] U.S. Cl. ......................................... 60/269; 446/56
[58] Field of Search ......... 60/269; 416/210 R, 214 R; 415/216, 217, 219; 446/56

[56] References Cited

U.S. PATENT DOCUMENTS

| | | | |
|---|---|---|---|
| 2,130,145 | 9/1938 | McKee | 416/214 R |
| 2,547,095 | 4/1951 | Robins | 60/269 |
| 2,795,373 | 6/1957 | Hewson | 415/216 |
| 3,758,229 | 9/1973 | Price et al. | 415/219 |
| 3,806,067 | 4/1974 | Kutney | 60/226.1 |
| 4,250,658 | 2/1981 | Kress | 446/56 |
| 4,307,857 | 12/1981 | Godberson | 446/56 |
| 4,369,149 | 1/1983 | Violett | 416/214 R |
| 4,557,107 | 12/1985 | Violett et al. | 60/269 |

FOREIGN PATENT DOCUMENTS

| | | | |
|---|---|---|---|
| 2238321 | 2/1975 | France | 446/56 |
| 740757 | 11/1955 | United Kingdom | 416/214 R |

*Primary Examiner*—Louis J. Casaregola
*Assistant Examiner*—Donald E. Stout
*Attorney, Agent, or Firm*—Duckworth, Allen, Dyer

[57] ABSTRACT

A ducted fan type model aircraft power plant having a mounting for a one cylinder internal combustion model aircraft engine. The preferred engine utilized a special vertically oriented carburetor. A duct is supported by a set of stators having an aerodynamic shape for straightening airflow through the duct. A fan having seven identical individual replaceable blades is disposed at the front of the duct and directly driven by the engine. One stator is adapted to essentially enclose the vertical carburetor and to smoothly direct the airflow from the fan around the carburetor to the engine cylinder for cooling. The stator has an opening to the carburetor air inlet for providing air under pressure thereto. The stator shapes cooperate with the duct and aft fairings of the power plant to deliver a smooth airstream having a uniform non-turbulent flow to produce a maximum propulsive efficiency.

3 Claims, 15 Drawing Figures

POWER PLANT FOR MODEL JET AIRCRAFT

The following is a continuation-in-part of copending application, Ser. No. 272,914 now U.S. Pat. No. 4,557,107, filed June 12, 1981.

BACKGROUND OF THE INVENTION

1. Field of the Invention.

This invention relates tO power plants for model airplanes and the like and more particularly to a turbine-like power plant for use in model jet aircraft.

2. Description of the Prior Art.

During the days when only reciprocating engines were used for aircraft, a number of small reciprocating type internal combustion engines were developed for powering model aircraft. The engines have been very highly developed so as to provide an ideal engine for small model airplanes driven by conventional propellers. However, with the advent of modern jet aircraft, model builders and model airplane enthusiasts have generated a requirement for a modified reciprocating internal combustion engine which could be installed inside of the fuselage of the model to power scale model jet aircraft either single or multi-engine type.

In response to this requirement, a number of shrouded fan type engines have been developed. A typical configuration for such shrouded fan engines may be found in U.S. Pat. No. Des. 241,360 to Scozzafava which is typical of known prior art engines of this type. A cylindrical duct or shroud is provided having a series of radial struts which support an engine mount concentric with the duct. The engine mount is generally cylindrical, tapering to a small diameter at its rear end. The cylindrical mount is cut away to permit a conventional model internal combustion engine, such as previously used to drive a propeller, to be mounted therein. A multiblade fan is attached to the output shaft of the engine, which is concentric with the shroud, such that the blades are fully enclosed by the duct or shroud.

Although the prior art engines of this type have been used by mounting the entire unit inside the fuselage of the model aircraft and having a jet-like opening at the rear through which the moving stream of air produced by the rotating fan blades can issue, the prior art designs have resulted in a number of problems, many of which are necessarily corrected by modifying the air frame. Among the problems is that of straightening the airflow which will have a spiral slipstream due to the fan rotation. Another problem is the non-uniformity of the slipstream due to problems in providing cooling air to the engine. This problem is compounded by the conventional carburetor designs. In the usual model aircraft engine for propeller driven planes, carburetor barrels, controls and adjustments are horizontally oriented and project outboard from the engine. This is normally done with propeller driven model planes to permit the carburetor controls to project through the cowling for ease of adjustment. When used with a ducted fan engine, a horizontal carburetor construction will result in an interrupted and uneven slipstream since the carburetor is assymmetrical with respect to the engine mount and slipstream.

Another problem present in the prior art engines of this type is that of maintaining maximum efficiency of the fan. For high efficiency, it is necessary to minimize the clearance between the fan tips and the shroud; however, most fans are molded in one piece from plastics which tend to have shrinkage which is not always symmetrical with the results that fans may have non-uniform blade tip clearance which reduces the efficiency thereof. Similarly, when the duct or shroud is molded, for example, such as that of the Scozzafava patent, it is very difficult to obtain and exactly round shroud due to the complexity of the mold and the tendency of the plastic to shrink slightly. Therefore, it is often necessary to build up or trim the shrouds by hand to compensate for such deviations which adds to the cost and complexity of the power plant. The assembly of the engine mount within the shroud can cause distortion.

Therefore, there is a need for a modern fan-type model aircraft power plant designed specifically for use in model jet aircraft in which the spiraling slipstream can be straightened accurately, having a carburetor which will not interfere with the airflow, which can be completely faired to the airstream, which has all engine adjustments outside the airflow, and which has a fan and shroud assembly in which all blades are identical and have uniform clearance with the shroud. The shroud design should allow the airstream to flow around the engine cylinder without appreciable pressure losses.

SUMMARY OF THE INVENTION

The invention is a shrouded or ducted fan type model aircraft power plant which utilized a conventional internal combustion, one-cylinder model aircraft engine having a special vertically-oriented carburetor. The duct is supported by a primary stator and three secondary stators having a special aerodynamic design which effectively straightens the spiraling airstream from the fan. The primary stator includes means for airflow around the vertically-oriented carburetor to the cylinder of the engine in a manner which does not interfere with the propulsion airflow. The volumes between adjacent stator elements are equalized by an assymmetrical design of the duct to thereby produce an airstream having a relatively uniform cross sectional area and pressure gradient.

The fan is of a novel design having seven individual blades, each of which are individually molded from the same mold cavity, and will therefore have identical shapes and characteristics. Each blade includes a cylindrical boss having a concentric opening therethrough. A pair of inner fan hubs is provided, each having seven cylindrical studs distributed uniformly around the periphery of a face thereof. A set of seven blades, each blade having an opening through its boss into which the hub studs fit, are clamped between the two hubs. An essentially hemispherical front or outer hub is provided having seven tapped holes matching with holes through the centers of each of the studs such that a set of seven screws may be threaded through the two inner hubs into the outer hub to firmly hold the seven fan blades in their proper orientation. In the event one or more fan blades become damaged in use, the fan assembly can be disassembled and the damaged portions replaced. Due to the uniformity of the blades, this novel portion of the invention provides a well-balanced, close tolerance fan assembly. A bore through the center of the inner hubs is designed to fit the drive shaft portion of a conventional model aircraft engine and may be held in place with an Allen head bolt accessible through an opening in the front or outer hub. The recessed hexhead of the bolt also permits the use of a simple articulated rod having a matching hex end for starting of the engine.

The novel carburetor, which permits an even laminar flow of cooling air to the engine cylinder, is designed to have an essentially cylindrical body having a lower throat projecting at an angle with the body which is inserted into the intake opening of the engine. An upper part of the cylindrical body is relieved to provide a relatively thin web portion aligned with the axis of the engine and having the forward portion tapered to a sharp point. The top portion of the carburetor projects through the top of the duct. The primary stator is formed to accept the carburetor body in a center portion thereof. The outer portion of the primary stator is curved to provide smooth airflow around either side of the carburetor body and past the engine cylinder. An opening forward in the top portion of the primary stator has an inlet portion which receives air from the fan and an outlet portion aligned with the sharp forward edge of the carburetor body web. A port is also provided to supply the carburetor air via a matching forward opening therein. The portion of the incoming air at the top of the primary stator will flow around the web which is immediately ahead of the engine cylinder and thence around the cylinder for cooling while the portion entering the port provides air under pressure to the carburetor.

A pair of concentric tubes are disposed concentric with the generally circular carburetor body, passing through the center of the web. The inner concentric fuel supply tube includes an inlet at the top of the carburetor. A fuel pump on the engine delivers fuel from a tank via a needle valve to a fuel supply tube inlet. The lower end of the inner concentric tube is closed and a small slot is provided in its side wall near the lower end through which the fuel will pass into the throat of the carburetor. The inner fuel supply tube may be rotated by loosening mounting screws at the top of the carburetor for adjustment of the slot relative to the outer tube. The outer concentric throttle tube is provided with a throttle lever arm at the top end of the carburetor to permit it to be rotated relative to the carburetor body and to the inner fuel supply tube. The throttle tube has an air control opening at the lower end communicating with the carburetor air opening in the forward portion of the carburetor body. The lower end of the throttle tube also has an opening adjacent the slot in the inner fuel supply tube. Moving the lever will rotate the outer throttle tube varying the air supply and will partially open or block the opening in the fuel supply tube to control the fuel-air mixture into the engine. The fuel inlet, controls for operating the throttle, and the needle valve are all external to the duct and are therefore out of the airstream from the fan.

As may now be recognized, the vertically-oriented cylindrical carburetor is effective to permit engine cooling air to flow by the carburetor without disturbing the desired laminar airflow and has its operating controls all concentric and symmetrical with such controls accessible from the top, outside of the propulsion airstream.

A streamlined fairing is mounted on the rear of the engine mount and is baffled to direct the cooling airflow outward in line with the propulsion airflow. The fairing also provides access through its outer end for adjustment of the fuel pump on the engine.

The duct for the engine utilizes a separate shroud or ring which is installed after the engine is in place and the fan mounted on the front of the engine. The separate shroud ring can be accurately molded to be exactly circular since it is completely symmetrical, in contrast to prior art ducts in which the ring has been integral with the body and which is subject to shrinkage and to stresses created during assembly such that producing perfectly round rings has been very difficult. The ring is mounted over the fan blades and secured to four mounting tabs on the duct. The mounting holes of the mating tabs on the fan ring are oversize such that the ring may be moved slightly to be exactly centered with respect to the fan blades before tightening of the mounting screws. Therefore, exact alignment and maximum fan efficiency may be obtained.

It is therefore a principal object of the invention to provide a ducted fan internal combustion engine to be used as a power plant for model jet aircraft in which the propulsion airstream is essentially uniform and without significant spiraling and loss of pressure.

It is another object of the invention to provide a duct and engine mount having a set of stators for straightening the normally spiraling airstream.

It is yet another object of the invention to provide a novel vertically-oriented carburetor having all of its controls at the top end and which are accessible from outside of the propulsion airstream whereby such controls do not interfere with the propulsion airflow, are easy to adjust, and are suitable for radio control It is still another object of the invention to provide a vertically-oriented carburetor having a central portion thereof formed to provide even airflow around such portion.

It is a further object of the invention to provide a duct having its volume adjusted with respect to the primary and secondary stators so as to have an equal volume of airflow through each portion thereof.

It is still a further object of the invention to provide a fan having a plurality of separate blades which can be disassembled to replace blades when the occasion requires.

It is yet a further object of the invention to provide a fairing for the engine having baffles to direct the engine cooling airflow exhaust so as to not to disurb the propulsion airflow.

These and other objects and advantages of my invention will be noted from the following detailed description when read in conjunction with the drawings.

DETAILED DESCRIPTION OF THE PREFERRED EMBODIMENT

Figure 1:
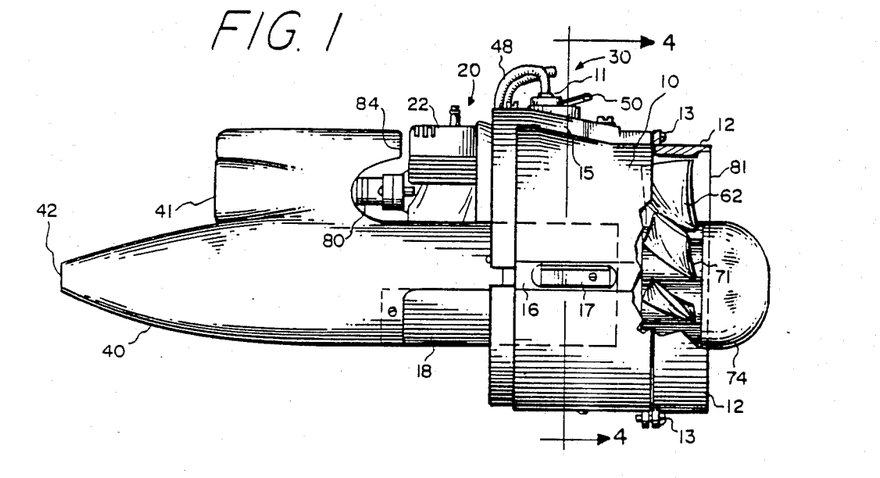
FIG. 1 is a side view of the ducted fan power plant of the invention having a conventional model aircraft internal combustion engine mounted therein.
Figure 2:
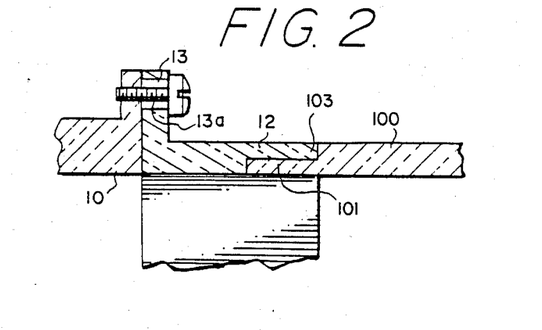
FIG. 2 is a cross sectional detail of the means of mounting the fan ring onto the duct of the power plant of FIG. 1.
Figure 3:
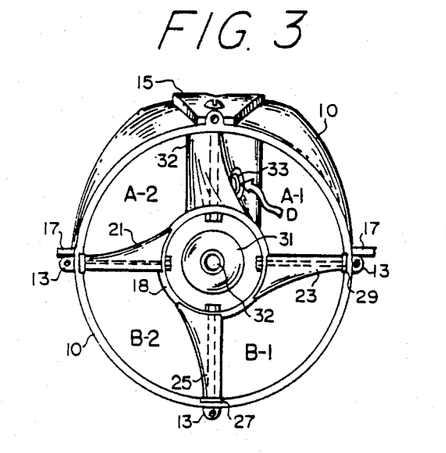
FIG. 3 is a front view of the power plant of FIG. 1 in which the fan has been removed showing the shapes of the duct and of the primary and secondary stators.

FIG. 1 is a side view of the preferred embodiment of the power plant of the invention. Duct 10 is provided having a circular fan shroud ring 12, shown cut away, mounted at the front thereof. Fan shroud ring 12 is mounted to duct 10 by means of four equally spaced tabs 13 and screws 13a as best seen in FIG. 2 and FIG. 3. In FIG. 2, it may be noted that the mounting hole in tab 13 is slightly larger than mounting screw 13a which threads into tabs at the front of duct 10, an inlet air duct 100 having a rabbeted output edge 101 fits into a complementary rabbett 103 in ring 12 as shown in the cross-sectional view of FIG. 2 to provide a smooth interface and airflow transition. The extra space in tab 13 permits ring 12 to be shifted slightly prior to tightening of screws 13a to accurately align ring 12 with the fan blades as will be discussed more fully hereinbelow. Duct 10 is mounted to engine mount 18, as may be noted in FIG. 3, by primary stator 32 and three secondary stators 21, 23, and 25. The lower half of duct 10 is semi-cylindrical in shape as can be seen in FIG. 3 and from the cross sectional view through plane 4—4 of FIG. 1 in FIG. 4. However, the upper portion of duct 10 will vary from being semi-circular at its forward end to which fan shroud ring 12 is attached, to a noncircular shape at the rear thereof which may be seen from FIG. 1 to be slightly higher then at the front. A flat platform portion 15 at the top rear of duct 10 is used to mount carburetor 30 having needle valve 11 and throttle arm 50 as shown in FIG. 1. A groove 16 on either side of duct 10 provides a recess for mounting of angle brackets 17 which are used to mount the power plant in the fuselage of a model aircraft.

Figure 4:
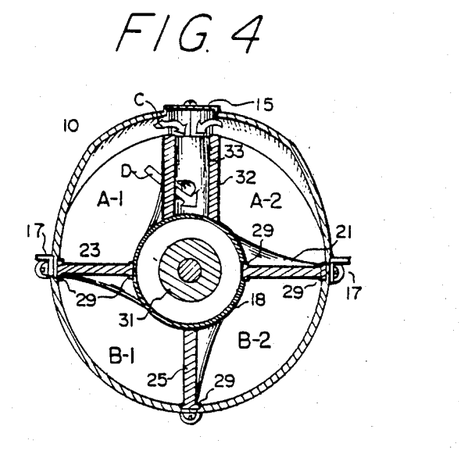
FIG. 4 is a cross section of the duct of FIG. 1 looking forward showing airflow through the primary stator.

A single cylinder model aircraft engine 20 is mounted in engine mount 18 having its drive shaft 31, seen in FIGS. 3 and 4, essentially concentric with the front of duct 10 and ring 12. Fan 81 is shown in the cut away portion of ring 12. Fan blade units 62 are disposed in a special hub assembly, not shown, and to be described later, with front hub 74 shown. Each blade is separately molded having a base portion 71 such that all blades are identical. Close clearance between the tips of blades 63 and fan shroud ring 12 is maintained. An aft fairing or cowling 40 is attached to motor mount 18 having an outlet 41 through which the exhaust pipe 85 seen in FIG. 14 passes and an opening 42 which gives access to an adjustable fuel pump on the rear of the drive shaft of engine 20. Cowling 40 will be described in more detail below.

Figure 5:
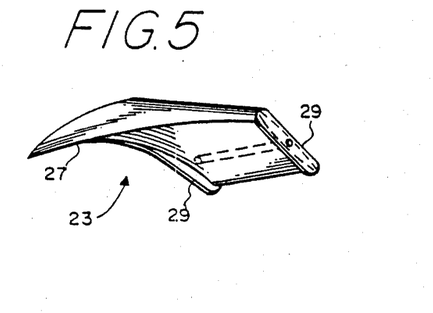
FIG. 5 is a perspective view of one of the secondary stators shown in FIGS. 3 and 4.

Referring now to FIGS. 3 and 4 and with reference to FIG. 5, the functions of the stators will be described. When fan 81 is rotating, air is drawn into duct 10 exiting at the rear of duct 10 and flowing around engine 20 and fairing 40 through a closed fairing (not shown) in the model aircraft which forms a tail pipe through which the airstream exits producing a jet-like propulsion force. Due to the rotation of the fan, the airflow tends to spiral which would, if allowed to continue through the tail pipe, create more pressure loss due to prolonged contact with walls of the tail pipe and due to turbulence. It is therefore necessary to straighten the airflow prior to its exit through the tail pipe and to attempt to produce a relatively uniform cross sectional velocity of airflow at the tail pipe. To this end, primary stator 32 and secondary stators 21, 23 and 25 serve to produce the desired straightening effect and to equalize the airflow. Each stator has an airfoil aerodynamic design developed as a circular arc such as to produce a counter-rotating torque to the airstream which will tend to cancel the opposite-direction rotation induced by the fan blades. As noted in FIG. 5, secondary stator 23 is formed to curve downward and to have a sharp edge 27 to maintain laminar airflow over the stator. Stator 23 includes foot portions 29 which fit into a groove on the inner surface of duct 10 and a groove on the outer surface of mount 18 to assure accurate installation, alignment and rigidity. A screw through duct 10 and the opening in stator 23 bolts to motor mount 18 and, along with the other secondary stators 21 and 25 and with primary stator 32, serves to support engine mount 18 central to fan ring 12 and duct 10. It may be noted that secondary stators 21 and 25 are identical to secondary stator 23 shown in FIG. 5 and therefore each serves to tend to straighten the airflow in its area.

Primary stator 32 differs from secondary stators 21, 23, and 25 by virtue of the fact that it also serves to direct air around carburetor 30 and to supply cooling air to the cylinder 22 of engine 20. The shape and construction of the primary stator 32 is best seen from the prespective view in FIG. 6 and the top view in FIG. 7. Carburetor 30, to be more fully described below, fits into the open area 92 of stator 32 such that the main portion of the airstream from the fan passes around carburetor 30. The shape of edge 93 of stator 32 is curved as in the secondary stators and serves to impart a counter-rotating torque to the airstream for straightening purposes as previously discueed. A relieved portion 95 at the top of stator 32 permits passage of air from the fan, around web 44 or carburetor 30, and to the cylinder of engine 20. The solid arrows in FIG. 4 indicate this cooling airflow. An opening 33 through the front portion of stator 32 is concentric and aligned with carburetor air inlet 34 of carburetor 30 as indicated by solid arrow D of FIGS. 3 and 4. As may be noted from FIGS. 3 and 4, the stators divide the duct into four areas, A1, A2, B1 and B2. Since the frontal area of primary stator 32 is larger than that of the secondary stators 21, 23 and 25, areas A1 and A2 would be smaller than areas B1 and B2 if duct 10 were cylindrical. It is for this reason that the rear portion of duct 10 is enlarged to compensate for the frontal area of primary stator 32. Thus, the airflow from areas A1 and A2 are compensated to be equal to the airflow from areas B1 and B2 in accordance with the invention. However, area A2 is made to have slightly less volume than quadrant A1 to adjust for pressure loss from the air through opening 33 and the opening formed by relieved area 95 of stator 32. The exit areas are all equal.

Figure 6:
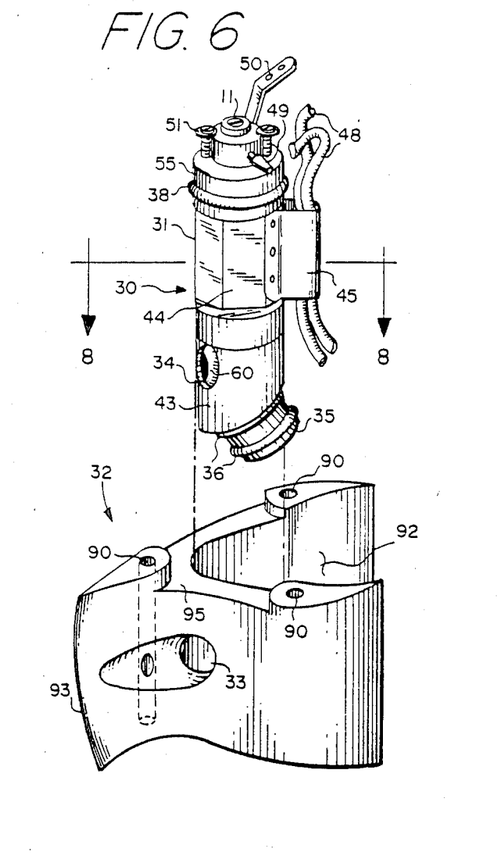
FIG. 6 is a perspective view of the primary stator and the vertically-oriented carburetor in an exploded relation.
Figure 7:
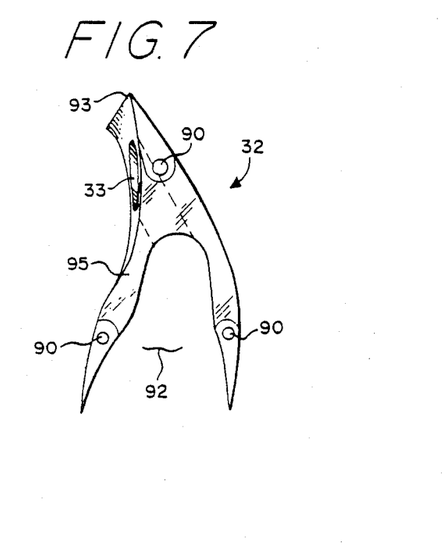
FIG. 7 is a top view of the primary stator of FIG. 6.
Figure 8:
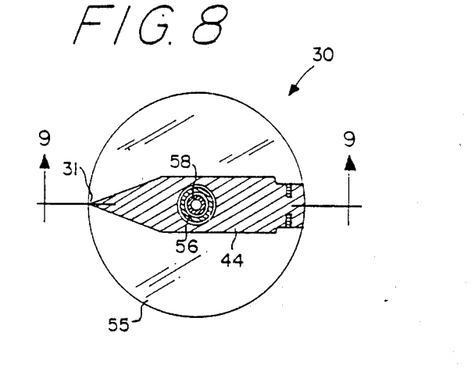
FIG. 8 is a cross-section through the plane 8—8 of the carburetor of FIG. 6.
Figure 9:
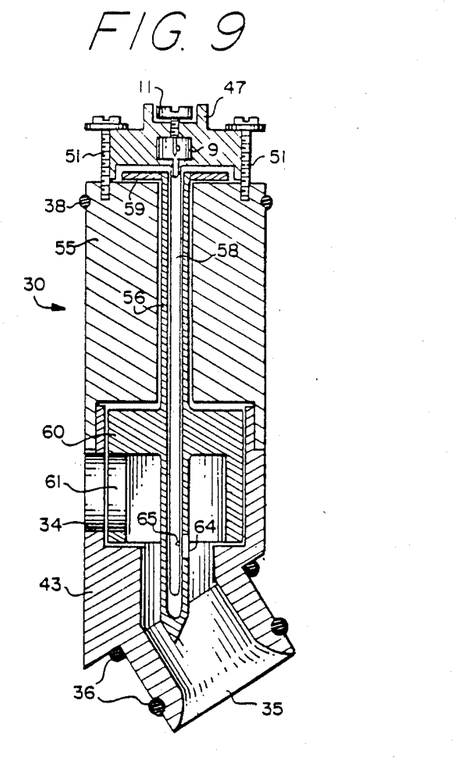
FIG. 9 is a cross sectional view of the carburetor of FIG. 6 through the plane 9—9 of FIG. 8.
Figures 10, 11, 12, 13:
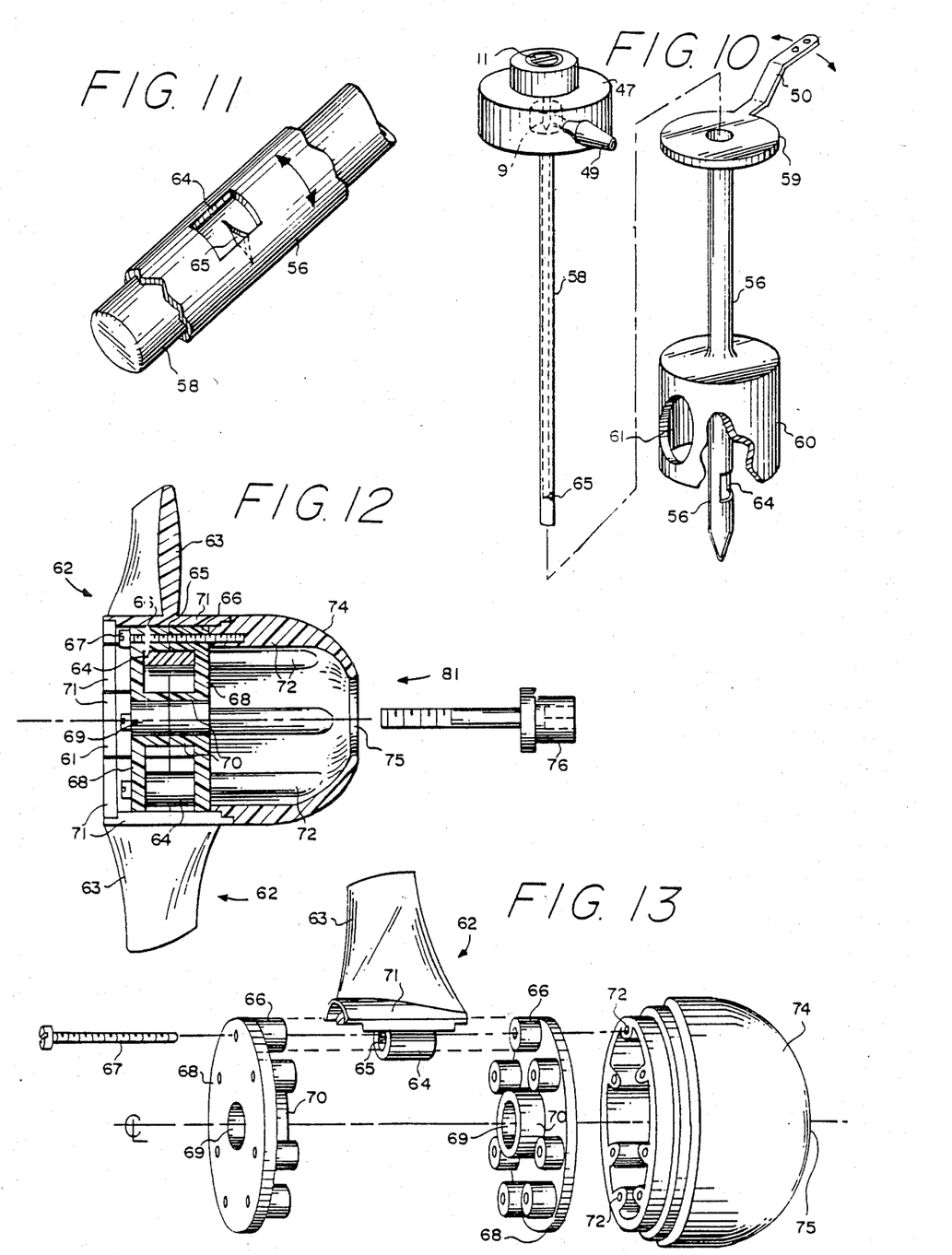
FIG. 10 is a perspective view of the fuel feed tube and the throttle tube of the carburetor of FIG. 9 in exploded view with portions of the throttle tube cut away.
FIG. 11 is an enlarged partial view of the fuel feed tube and throttle tube indicating the shape of the fuel delivery slot.
FIG. 12 is a cross sectional view of the fan assembly of the invention including the mounting bolt for mounting the fan on the engine.
FIG. 13 is an exploded perspective view of the fan of FIG. 12 showing one blade to illustrate the assembly thereof.

Of special importance to the ducted fan power plant of the invention is vertically oriented carburetor 30 shown in FIGS. 6, 8, and 9 with details thereof shown in FIG. 10. A typical aircraft engine such as engine 20 to be used with the power plant of the invention will have a fuel intake port or opening extending upward at an angle from the crankcase area just behind the output drive shaft. Carburetor 30 includes a throat section 35 designed to fit into the engine fuel intake port with O-rings 36 producing a tight fit. Primary stator 32 fits the countours of cylindrical motor mount 18 and is mounted on the top surface thereof by three screws which pass through the upper portion of duct 10 and through openings 90 in stator 93 into motor mount 18. An opening in the platform 15 of duct 10 directly above opening 92 in stator 32 permits the body of carburetor 30 to pass through with O-rings 38 forming an airtight seal with the opening in platform 15. As may now be recognized, carburetor 30 will fit in opening 92 in stator 32 such that the major portion of the airflow from the fan blades will be directed around carburetor 30 by stator 32. Opening 33 in the front portion of stator 32, as seen in FIG. 6 and FIG. 7, will direct a portion of the incoming air under pressure into carburetor 30. As best seen in FIGS. 6 and 8, the upper portion of body 55 of carburetor 30 is cut away to form web 44 having a sharp front edge 31. Thus, airflow through opening 95 will flow around web portion 44 and exit at the back of stator 32. This air is therefore guided towards the cylinder 22 of engine 20 for cooling purposes. Opening 33 is such that air is directed under pressure into opening 34 in lower body portion 43 of carburetor 30. This serves as the necessary air for the fuel air mixture from carburetor 30. As may now be seen, the vertical design of carburetor 30 with the web shaped central portion 31 permitting a symmetrical arrangement of stator 32 to smoothly direct air around the carburetor and thereafter around cylinder 22 of engine 20 and also to collect and direct cooling air to cylinder 22.

The adjustments of carburetor 30 which include upper control boss 47, throttle 50, and needle valve 11 are advantageously outside of duct 10 and therefore will not interfere with the propulsion or cooling airflow. With known prior art engines, such controls and other carburetor parts have been necessarily disposed directly in the propulsion airflow, creating turbulence and affecting the efficiency of the power plant. Details of the inner construction of the carburetor 30 which permit the novel vertical design are shown more clearly in FIGS. 8, 9 and 10. In the cross-sectional view of FIG. 9 through plane 9—9 of FIG. 8, it may be noted that the body is formed from lower body 43 and upper body 55. Concentric with the cylindrical portions of body 43 and 55, a pair of concentric hollow tubes 56 and 58 are disposed with tube 58 serving as a fuel supply tube. An upper control boss 47, integral with tube 58, includes a fitting 49 communicating with chamber 9 and tube 58. A flexible fuel line, such as tubing 48, may be attached to fitting 49. Needle valve 11 extends into chamber 9 with its tapered point controlling the flow of fuel into tube 58. Mounting screws 51 serve to hold boss 47 tightly in place. The lower end of fuel supply tube 58 is closed and a small slot 65 is provided for exit of fuel into the carburetor throad. Throttle tube 56, as seen in FIG. 9. also has a closed lower end and has an opening 64 as provided as best seen in FIGS. 10 and 11. Thus, fuel through slot 65 also passes through opening 64. Throttle tube 56 also has a choke or air control skirt 60, shown partially cut away. Opening 61 in skirt 60 will mate with opening 34 to vary the input air as throttle arm 50 is rotated as indicated by the arrows. At the same time, opening 64 will mate with slot 65 in tube 58 to vary the fuel input simultaneously with variation in air input. As can be seen in FIG. 11, slot 65 is nonlinear to give a smooth throttle adjustment. Fuel supply tube 58 may be adjusted independently by loosening screws 51 and rotating boss 47 to set the fuel-air ratio prior to operation of the model airplanes.

It may be noted that the novel design of primary stator 32, which provides carburetor air under pressure, has been found to produce an increase of 500 to 600 rpm over prior art engines and a 15 to 20% overall performance improvement.

In a typical engine 20, a fuel pump is provided at the rear of the crankshaft which draws fuel from a fuel tank and delivers it to the carburetor. Needle valve 11 is provided for high speed adjustment. To route the necessary fuel lines, such as lines 48, without affecting the cooling airflow, a bracket 45 is attached to the rear of web 44, serving to both cover lines 48 and to hold them in place.

Turning now to FIGS. 12 and 13, details of the novel fan blade assembly 81 are shown. FIG. 12 is a cross-sectional view through an assembled fan 81 and FIG. 13 is an exploded view of the hubs 68 and 74 of the assembly 81 showing one blade unit 62 to indicate the method of assembly. Although a different number of blades may be used, a seven bladed fan has been found to be efficient. A set of blades 62 is molded, preferably with all blades for one assembly formed in the same mold. Therefore, any shrinkage after molding would be uniform from blade to blade assuring equal size, angle and weight of each blade. Therefore, the assembled fan will be inherently well balanced. Each blade 63 extends from an arcuate base 71 having an arc equal to 360° divided by the number of blades. Thus, when a set of blades is assembled, bases 71 form a continuous rim from which the each blade 63 extends. As may be noted, each end of base 71 includes a step which matches the other parts of the assembly, interlocking therewith to provide a rigid assembled fan. A boss 64 is integral with base 71 and has a concentric hole 65 therethrough. Two inner hubs 68 are provided each having a set of seven equally spaced cylindrical studs 66 which will fit snugly into hole 65 in boss 64. As best seen in FIG. 12, inner hubs 68 are brought together and studs 66 will contact each other such that boss 64 will be tightly gripped between the inner faces of inner hubs 68 as seen from the cross-sectional view of blade 62. From FIG. 12, the manner in which arcuate bases 71 of blades 62 mate together after assembly may also be seen. The inner hub 68 also includes a boss 70 having an opening 69 therethrough concentric with the hub perimeter.

Front hub or spinner cone 74 is provided to permit a smooth flow of air into the fan area, as a means for securing the fan assembly together, and to aid in starting of the engine. Front hub 74 is molded in the shape indicated from FIGS. 12 and 13, and includes seven bosses 72 having threaded holes matching the openings through studs 66. Screws 67 may therefore be inserted through the openings in hubs 68 and the threaded openings in bosses 72 to securely clamp the inner hubs together thereby rigidly clamping fan blades 62 in place.

Front hub 74 includes an opening 75 in its forward end through which bolt 76 may be inserted which will thread into drive shaft opening 37 seen in FIG. 3. Thus, bolt 76 serves to attach fan assembly 81 to the engine. Bolt 76 is preferably a socket-head bolt that can be tightened with an Allen wrench or similar socket-head wrench. Advantageously, this type of bolt permits a simple and positive method of starting the model aircraft engine 20. A shaft having a hex end that will fit the head of bolt 76 may be inserted through opening 75 into the head of bolt 76 and rotated with an external motor to start the engine. The starting rod may also include a ball joint to minimize alignment problems during starting. Alternatively, the flat portion of front hub 74 may be used with a belt for starting.

Although the inner hubs 68, front hub 74, and blades 62 may be molded from various types of plastic or the like, a preferable material which is tough and well suited to this application is MinlanR by duPont. This material also has the advantage of minimum shrinkage of parts after removing from the mold.

Figure 14:
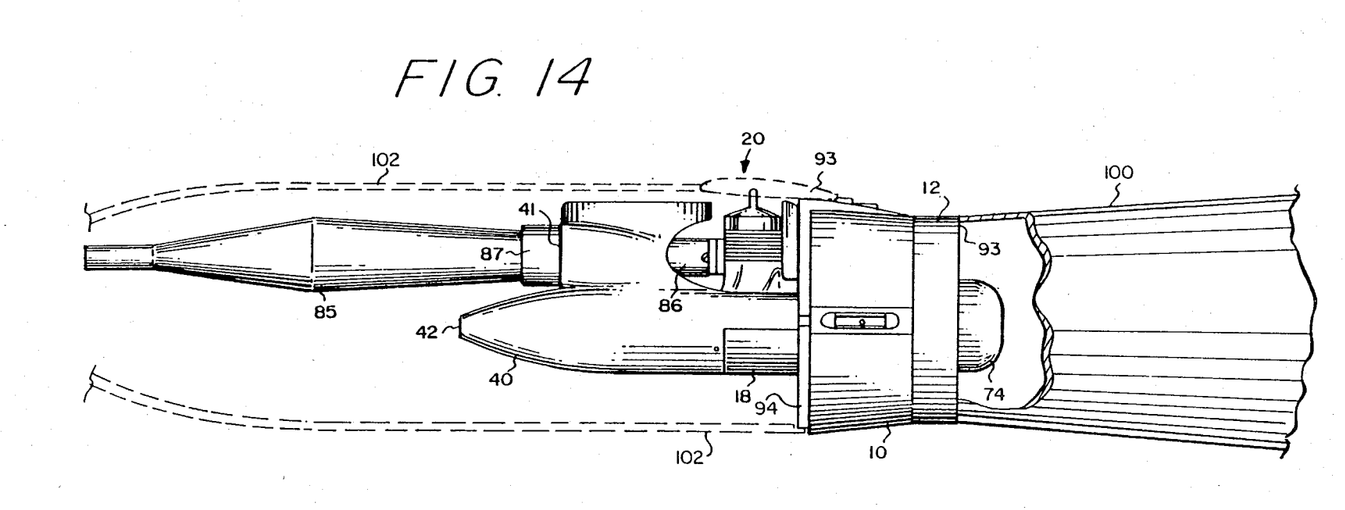
FIG. 14 is a side view of the assembled power plant having the exhaust muffler in place with the air inlet and tail pipe shown in phantom view.
Figure 15:
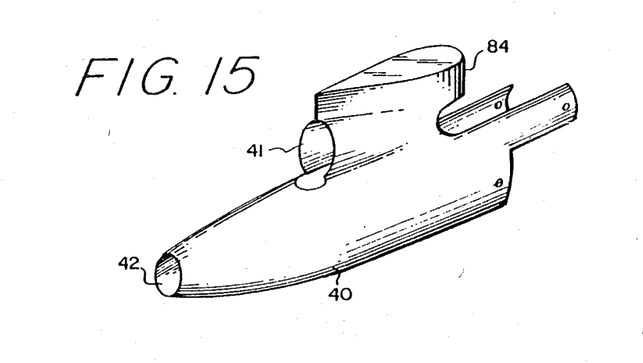
FIG. 15 is a perspective view of the aft fairing of FIG. 14.

Referring to FIG. 15, a perspective view of aft fairing or cowling 40 is shown. The forward part of cowling 40 attaches to the motor mount 18 of FIG. 1 by small screws. As previously discussed, the leading edge 93 of primary stator 32 directs the propulsion airflow around the cylinder 22 of engine 20. The engine cooling air passing around carburetor 30 passes around the fins of cylinder 22 and is directed by the curved surface 84 around the aft portion. The main body portion of cowling 40 tapers to a small opening 42 at its rear end which provides access to an adjustment on the fuel pump (not shown) mounted on the rear of the engine crankcase. Thus, cowling 40 serves as an aft streamlining for motor mount 18 to minimize interference with propulsion airflow and as a means of directing the exhaust cooling air from engine 20 to prevent that exhaust air from interfering with the propulsion airflow in accordance with the invention. Opening 41 in cowling 40 serves as an exit for engine exhaust pipe and muffler 85 as seen in FIG. 14. A soft sleeve gasket 87 fits snugly into opening 41 and the inner end of exhaust pipe 86 couples to the exhaust part of engine 20.

As seen in FIG. 14, additional details of mounting of the power plant in a model aircraft are shown. Air inlet duct 100 shown in phantom view generally couples an opening in the aircraft nose to ring 12 of the power plant. As shown in the cross sectional view of FIG. 2, the inner end of duct 100 is rabbetted into ring 12 to provide a smooth flow of air into shroud 10. At the rear of the power plant, outlet duct 102, shown in phantom view, fits into a rabbett 94 in the rear of shroud 10 to maintain laminar airflow. A removable cap 93 provides access to engine 20 at the top of duct 102. The aft end of duct 102 tapers to form the air outlet tail pipe at the rear of the model aircraft to thereby provide the required jet-like thrust.

Having hereinabove described in detail the preferred embodiment of the power plant for model jet aircraft, it is pertinent to review briefly the advantages and functions obtainable from the disclosed novel combination of elements. the fan assembly, as contracted to prior art fans of this type which have been molded in one piece, allows less expensive molds to produce the parts and permits individual blade replacement when necessary. Since each blade can be formed in the same mold, the pitch angle and height of the blade from its base will be the same for each, eliminating any necessity to trim blade ends after molding. The front hub or spinner cone is adaptable to either direct starting of the engine through the use of a hexagonal starting rod or by a belt around the straight portion of the cone and also ensures good airflow into the fan blades. The fan ring shroud, which may be separately moled to be accurately circular, is mounted separately to allow perfect centering with respect to the blade tips. The design can therefore be made to minimize the tip-to-ring shroud clearance resulting in a more efficient power plant. The duct assembly is provided with a novel shape being semi-cylindrical on the bottom half in the fore and aft direction and out-of-round on the upper half to compensate for the extra air routed around the engine cylinder by the primary stator. In addition, the upper right quadrant viewed from the front has slightly less volume then the upper left quadrant which adjusts for pressure loss in the air flowing to the engine for cooling and carburetor intake. The novel primary and secondary stators serve to straighten the normally spiraling airflow from the fan to minimize energy loss due to interference from a spiraling propulsion airstream. The primary stator serves the important purpose of straightening the airflow through that region of the duct and routing the airflow around the engine in a laminar fashion thereby preventing turbulence. The primary stator also provides air directly to the carburetor throat under pressure giving a boost to the engine horsepower. It also directs cooling air to the engine cylinder without this air interfering with the propulsion airflow. In addition, the primary stator acts as a primary engine mount through the use of three bolts into the engine mount cylinder. The secondary stators provide great stability to the engine mount in the duct and, by means of molded feet at each end, provide accurate alignment by mating with grooves in the engine mount and the duct. The secondary stators also add to the structural integrity of the assembly and stability of the engine mounting system. The fairing or aft engine cowling serves to streamline the engine mount and engine cylinder preventing turbulence which would normally occur. It also supports the engine exhaust pipe and muffler.

An important factor in maintaining the even, smooth laminar airflow so as to produce a uniform propulsion airstream is the novel vertical carburetor design which provides a minimum cross sectional thickness in the vertical axis such that the carburetor can be completely enclosed by the primary stator yet incoming cooling air can be directed to the engine cylinder. Furthermore, the vertical design permits all of the controls and adjustments to be positioned at the top end outside of the primary duct and propulsion airstream. This permits ease of hookup of linkages for control in flight of these adjustments and provides a safety feature in that the user does not have to insert his fingers into the duct to adjust the carburetor while the engine is running. This eliminates the danger of injury from the fan. As may now be recognized, a power plant for a model jet aircraft has been disclosed having carefully integrated elements which increase the efficiency of the power plant and permit the use of highly developed one cylinder reciprocating internal combustion engines generally utilized for propeller driven model aircraft. Although specific designs of the various parts have been shown, it will be obvious to those of skill in the art that certain changes and modifications may be made without departing from the spirit and scope of the invention.

What is claimed is:

1. A model plane power plant employing an engine having a drive shaft and a portion of the engine extending generally transverse to said drive shaft, said power plant comprising:
   (a) a generally cylindrical duct having a central axis and having a forward end adapted to face into a direction of travel and a rearward end opposite said forward end;
   (b) a multibladed fan having an axis of rotation and being rotatably positioned in said duct adjacent said forward end, said axis of rotation of said fan being generally coincident with said axis of said duct;
   (c) an engine mounted with said duct adjacent said rearward end, said engine having a drive shaft extending forwardly to said fan, said engine further including a portion thereof extending laterally across said duct and generally transverse to said drive shaft;
   (d) a primary stator extending laterally across said duct between said laterally extending engine portion and said fan in order to direct air flow through said duct around said laterally extending portion of said engine;
   (e) secondary stator means extending across said duct and spaced from said primary stator, said primary stator and said secondary stator means and said duct defining a plurality of air flow passages from said forward end to said rearward end thereof; and wherein
   (f) said duct flares outwardly to a non-circular cross section at said rearward end on opposite sides of said primary stator, in order to obtain generally uniform cross section area of said air flow passages along said duct.

2. The model plane power plant recited in claim 1 wherein said primary stator has a dimension across said duct which is approximately the same as the corresponding dimension of said laterally extending engine portion, so that said primary stator directs air flow in said duct completely around said laterally extending engine portion, whereby said primary stator is generally wider than said secondary stator means across said duct.

3. The model plane power plant recited in claim 1 wherein said duct includes a portion which forms said outward flare, said flared portion positioned adjacent said laterally extending engine portion.

* * * * *